United States Patent [19]

Beck et al.

[11] Patent Number: 4,914,693
[45] Date of Patent: Apr. 3, 1990

[54] TELEPHONE SUBSCRIBER CIRCUIT

[75] Inventors: Helmuth Beck, Klosterneuburg; Erik Mally, Vienna, both of Austria

[73] Assignee: Siemens Aktiengesellschaft, Berlin and Munich, Fed. Rep. of Germany

[21] Appl. No.: 51,441

[22] Filed: May 18, 1987

[30] Foreign Application Priority Data

May 23, 1986 [AT] Austria .................................. 1380/86

[51] Int. Cl.⁴ .......................................... H04M 19/00
[52] U.S. Cl. .................................... 379/413; 379/405; 379/398
[58] Field of Search ............... 379/387, 398, 399, 400, 379/405, 413, 412, 345

[56] References Cited

U.S. PATENT DOCUMENTS

| | | | |
|---|---|---|---|
| 3,855,430 | 12/1974 | Colardelle et al. | 379/405 |
| 4,053,722 | 10/1977 | Nahay | 379/405 |
| 4,283,604 | 8/1981 | Chambers, Jr. | 379/413 |
| 4,287,393 | 9/1981 | Revekamp | 379/413 X |
| 4,387,277 | 6/1983 | Giles et al. | 379/405 X |
| 4,472,608 | 9/1984 | Beirne | 379/399 |

FOREIGN PATENT DOCUMENTS 0152178 8/1985 Fed. Rep. of Germany .
0244191 10/1986 Japan ........................................ 379/398
1257878 12/1971 United Kingdom .

*Primary Examiner*—Jin F. Ng
*Assistant Examiner*—Randall S. Vaas
*Attorney, Agent, or Firm*—Adel A. Ahmed

[57] ABSTRACT

A telephone subscriber circuit of a telephone exchange comprising active circuit elements with a capacitively-complex input impednace, wherein the signal which is to be transmitted from the exchange to the subscriber is amplified by two operational amplifiers operating in push-pull and is fed via two coupling arms, formed by a series arrangement of a capacitor and a resistor, into the subscriber loop which is itself supplied with d.c. current via two supply resistors. The subscriber circuit in accordance with the invention serves as a compensation network which directionally isolates the signals of the two speech directions and which includes two arms via which the symmetrical subscriber signal is supplied to a subscriber amplifier. In accordance with the invention the entire complex input impedance is sub-divided into a complex and a real component. The complex component serves as a coupling arm which supplies the LF-signal which is to be transmitted and which blocks the d.c. current from the operational amplifiers. The real component serves to supply the supply d.c. current.

1 Claim, 1 Drawing Sheet

TELEPHONE SUBSCRIBER CIRCUIT

BACKGROUND OF THE INVENTION

The present invention relates to a telephone subscriber circuit of a telephone exchange comprising active circuit elements with a capacitive, complex input impedance, wherein the signal which is to be transmitted from the exchange to the subscriber is amplified by two operational amplifiers operating in push-pull and is fed via two coupling arms, formed by a series arrangement of a capacitor and a resistor, into the subscriber loop which is supplied wit d.c. current via two supply resistors, whilst the symmetrical subscriber signal is supplied to a subscriber amplifier via two arms of the compensation network, which serves to directionally isolate the signals of the two speech directions.

In an endeavor to improve the side-tone reference attenuation at the subscriber station and thus the transmission quality, efforts to improve the electrical matching of the subscriber circuit to the subscriber speech stations are of particular importance. In conventional telephone systems an input impedance of 600 Ohms was provided in real form, but did not comply with the high transmission quality requirements.

An aim of the present invention is to provide a telephone subscriber circuit which complies with the stated requirements, which it achieves in that the entire complex input impedance is subdivided into a complex component which, as coupling arm, serves to supply the LF-signal which is to be transmitted and to block the d.c. current from the operational amplifiers, and into a real component via which the supply d.c. current is supplied.

By means of this circuit in accordance with the invention, a determinate, capacitively-complex input impedance of the subscriber circuit can be achieved which facilitates the qualitatively high grade matching. A sufficiently powerful supply d.c. current can be used without the need for an unreasonably high supply voltage.

The capacitors required in the coupling arms in order to produce the complex input impedance simultaneously serve to block the d.c. current of the amplifiers from the speech wires, without the need for high capacitance values for this purpose.

In accordance with a further feature of the invention, the high-frequency emphasis produced by the coupling arms is counteracted by a frequency-dependent negative feedback of the amplifier.

A further feature of the invention consists in that disturbance of the input impedance by the compensation network is avoided by the high impedance design of the letter.

The requirement that the input impedance and balancing impedance should be identical facilitates a transformation of the compensation network which leads to a simple construction of the network requiring few components. The arms of the compensation network contain only resistors, so that the reception of the subscriber signal is governed by a linear frequency response. In order to fulfill the symmetry requirement, with the selected sub-division of the input impedance (into supply resistor and coupling arm), and with the described transformation of the compensation network, it is merely necessary that four capacitors should match one another in pairs.

BRIEF DESCRIPTION OF THE DRAWINGS

An exemplary embodiment of the invention is shown in FIG. 1 of the drawing, whereas

DETAILED DESCRIPTION OF THE DRAWINGS

The subscriber circuit TS, which is assigned to the subscriber station TN., is connected thereto via the speech wires a, b. The connection to the switching network KF provided in the telephone exchange is established on the one hand via the input E of the subscriber circuit TS, provided for the signal transmission direction from the exchange to the subscriber TN, and on the other hand in the reverse direction via the output A.

Figure 2:
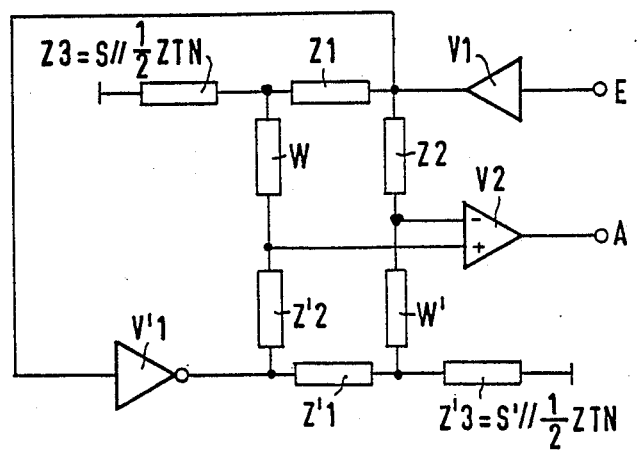
FIG. 2 is a simplified diagram of the principle of directional isolation.

The signal incoming via the input E is amplified by the operational amplifier V1, which has a frequency-dependent negative feedback arrangement, and from said operational amplifier Va and the operational amplifier V'1 is fed into the subscriber loop aTNb in phase-opposing fashion via the capacitors C1 and C'1, which serve as isolating capacitors, and via the series resistors R1 and R'1 respectively. The phase opposition of the output signals of the operational amplifiers V1 and V'1 occurs in that the operational amplifier V'1 is supplied via its inverting input (−) with the output signal of the operational amplifier V1. In FIG. 2 this is symbolized by the representation of V'1 as an inverse element.

The subscriber circuit TN is supplied from the subscriber circuit TS with the operating d.c. voltage via the supply resistors S and S'. The signals from the subscriber station TN are fed via the speech wires a, b and via two coupling resistors W and W' to the inputs of a third operational amplifier V2 which is referred to as subscriber amplifier and whose output signal is fed via the output A to the switching network KF. Three terminals of the circuit which conduct a fixed reference potential during operation are referenced P. Two of these terminals P are connected to the non-inverting inputs of the operational amplifiers V1 and V'1, whereas the third serves to determine the input potential of the subscriber amplifier V2. The amplification of the subscriber amplifier V2 is governed by the ratio of the resistance value of its negative feedback resistor R3 and of its resistor R'3, which transmits the potential to the non-inverting input (+), to the coupling resistors W and W' respectively.

In a circuit equipped only with the previously-described circuit elements, without any additional measures the output signal supplied by the subscriber amplifier V2 would be influenced by the signal supplied by the operational amplifiers V1 and V'1 via the coupling resistors W and W'.

In order to compensate disturbing influences of this type, two compensation impedances Z2, Z'2 are therefore provided, which each consist of a RC-element R2, C2 and R'2, C'2 respectively. The function of the compensation circuit will be explained making reference to FIG. 2; the impedance Z3 (Z'3) is formed by the parallel arrangement of the supply resistor S (S') to half the value of the dummy (balancing) impedance ZTN (subscriber impedance).

The voltage supplied by the amplifier V1 (V'1) is divided by the series arrangement of Z1 (Z'1) and Z3 (Z'3), where the resistor W (W') represents a negligible load. Between this sub-voltage and the output of the amplifier V'1 (V1), which is inverse to the first amplifier, a further voltage divider W/Z'2 (W'/Z2) is arranged, which is such that the voltage zero occurs at its division point, which is connected to an input of the subscriber amplifier V2. As a result the difference voltage between the two inputs of V2 is likewise zero, which corresponds to a compensation of the voltage supplied via the input E.

Figure 1:
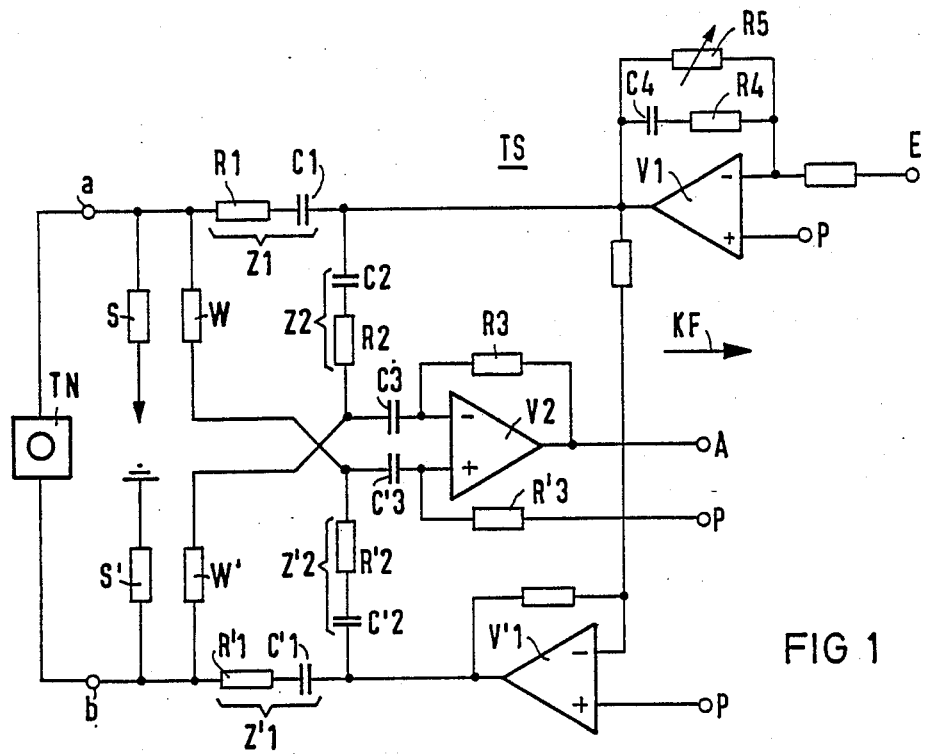

The capacitors C3 and C'3 in FIG. 1 serve merely to provide electrical isolation and have no influence on the compensation.

As regards the dimensioning of all the resistors and impedances, it should firstly be noted that the bridge arms (W,W',Z2,Z'2) are of substantially higher impedance than the coupling arms Z1, Z'1 and therefore hardly influence the input impedance of the subscriber circuit TS in respect of the speech a.c. current of the subscriber station TN. The supply current source, to which the supply resistors S, S' are connected, virtually represents a short-circuit for this speech a.c. current. Similarly the outputs of the operational amplifiers V1, V'1 virtually carry zero potential with reference to this speech a.c. current, so that the input impedance of the subscriber circuit is formed in close approximation by the series arrangement of the supply resistors S, S' and the series arrangement of the impedances Z1 and Z'1 which is parallel thereto.

Finally it should be noted that the amplification of the circuit in the direction of the subscriber TN can be adjusted by means of the resistor R6, whereas the amplification in the opposite direction can be adjusted by means of the resistors R3, R'3.

The following values have proved effective for the circuit in accordance with the invention:

| Resistors | S. S' | 520 Ohm |
|---|---|---|
| | R1. R'1 | 140,2 Ohm |
| | W, W' | 52,3 kiloohm |
| | R2, R'2 | 132 kiloohm |
| | R3, R'3 | 43,2 kiloohm |
| | R4 | 96,5 kiloohm |
| | R5 | 2,2 Megohm |
| Capacitors | C1, C'1 | 150 nanofarad |
| | C3, C'3 | 220 nanofarad |
| | C4 | 1 nanofarad |
| | C2, C'2 | 750 picofarad |

We claim:
1. A telephone subscriber circuit of a telephone exchange comprising active circuit elements with a capacitively complex input impedance, wherein an incoming signal which is to be transmitted from the exchange to the subscriber is amplified by two operational amplifiers operating in push-pull and is fed via a first pair of coupling arms, each formed by a series arrangement of a capacitor and a resistor, into two respective ends of the subscriber loop, which two ends are also supplied with d.c. current via respective connection to a supply voltage through two supply resistors, whereas a symmetrical, outgoing signal to be transmitted from the subscriber to the exchange is supplied from the two ends of the subscriber loop to a subscriber amplifier via a compensation network which serves to directionally isolate the incoming and outgoing signals of the two transmission directions, wherein the complex input impedance of said telephone subscriber circuit is sub-divided into a complex component provided by said first pair of coupling arms which serves to supply the incoming signal and to block the d.c. current from the operational amplifiers and into a real component provided by said supply resistors via which the supply d.c. current is supplied to the subscriber loop, and wherein the directional isolation of the incoming and outgoing signals to and from the subscriber loop is provided by the compensation network comprising said first pair of coupling arms Z1, Z"1) each having one end coupled to a respective end of the subscriber loop and its other end coupled to one of the operational amplifiers, a first pair of bridge arms each consisting of a coupling resistor (W, W") coupled between a respective end of the subscriber loop and an input of the subscriber amplifier, and a second pair of bridge arms each consisting of a compensation impedance (Z2, Z"2) formed by series-connected resistor and capacitor elements and coupled between a respective other end of one of said first pair of coupling arms and an input of the subscriber amplifier, wherein the impedance of the bridge arms of the compensation network is arranged to have a high impedance in comparison with the input impedance of the coupling arms to the subscriber loop.

* * * * *